United States Patent [19]

Kayser

[11] 4,178,002

[45] Dec. 11, 1979

[54] SEPARATING PISTON FOR HYDROPNEUMATIC ONE-TUBE VIBRATION DAMPER

[75] Inventor: Ernst Kayser, Birkenau, Fed. Rep. of Germany

[73] Assignee: Firma Carl Freudenberg, Weinheim an der Bergstrasse, Fed. Rep. of Germany

[21] Appl. No.: 663,166

[22] Filed: Mar. 2, 1976

[30] Foreign Application Priority Data

Mar. 29, 1975 [DE] Fed. Rep. of Germany ....... 2514056

[51] Int. Cl.² .......................... F16J 15/20; B61F 15/22
[52] U.S. Cl. ..................................... 277/212; 188/322
[58] Field of Search ...................... 74/18.1, 18.2, 17.8; 259/DIG. 43; 277/99, 212; 188/311, 322; 92/241, 243, 249, 250

[56] References Cited

U.S. PATENT DOCUMENTS

| | | | |
|---|---|---|---|
| 1,607,811 | 11/1926 | Blum | 259/DIG. 43 |
| 2,111,312 | 3/1938 | Clark | 277/212 |
| 2,188,106 | 1/1940 | Caldwell | 277/212 |
| 2,364,823 | 12/1944 | Schnell | 92/243 |
| 2,509,151 | 5/1950 | Kasten | 277/212 |
| 2,709,118 | 5/1955 | Martin | 277/212 |
| 2,753,008 | 7/1956 | Peirce | 277/212 |
| 2,781,208 | 2/1957 | Foss | 277/212 |
| 2,864,258 | 12/1958 | Klingler | 277/212 |

*Primary Examiner*—Benjamin W. Wyche
*Assistant Examiner*—Wesley S. Ratliff, Jr.
*Attorney, Agent, or Firm*—Sprung, Felfe, Horn, Lynch & Kramer

[57] ABSTRACT

A hydropneumatic one-tube vibration damper in known fashion comprises a cylinder and a displaceable piston separating the cylinder space into a chamber containing a hydraulic fluid and a chamber containing a pneumatic fluid. This piston carries an annular elastomeric sealing element comprising an inner portion clamped by said piston, an outer portion contacting said cylinder and an intermediate web portion, whereby small displacements of the piston can be accommodated by flexing of said web portion without displacement of said outer sealing element portion relative to said cylinder. Reinforcements may be embedded in the outer portion of the sealing element to increase its contact pressure against the cylinder and means may be provided to prevent canting of the piston in the cylinder.

11 Claims, 6 Drawing Figures

SEPARATING PISTON FOR HYDROPNEUMATIC ONE-TUBE VIBRATION DAMPER

The invention relates to an improvement and development in separating pistons as they are employed in hydropneumatic one-pipe telescope torsional vibration dampers in motor vehicles. It is known that in this kind of vibration damper part of the working cylinder is filled with a compressed gas in order to compensate for the volume of the piston rod running in and out. The gas chamber is preferably separated from the hydraulic chamber by a pending separating piston, as mixing of the substances leads to foaming and thus to a breakdown of the entire vibration damper.

The separating piston synchronously follows the movements of the piston rod in its movements under working conditions. It is usually a metal piston, the seal against the cylinder wall being preferably achieved by a resilient sealing ring inserted into a surrounding notch, e.g. an O-ring. Another separating piston consists of profiled sheet iron to which two sealing ridges are vulcanized (Corcos) for sealing and guiding.

The disadvantage of these constructions resides in the fact that in case of shifting of the piston rod the whole separating piston shifts, with friction in the working piston. This friction has disturbing effects on the driving comfort. In case of very small movements there is the danger that the lubricating film may rupture which would result in high wear of the seal and an early breakdown of the entire vibration damper.

In a newer embodiment of the separating piston as it is described in the German DOS No. 2,018,845, these disadvantages are avoided by providing the piston with a membrane which compensates for the small movements of the piston rod by means of only resilient deformation. Only upon large movements of the piston rod will the whole separating piston follow. This embodiment has the disadvantage that the membrane tends to harden, especially in case of high frequencies as occur in the construction of vehicles. Thus short pushes of the track are not absorbed according to the invention without friction.

Moreover, there is the danger of canting or tilting of the separating piston causing jamming in the working cylinder which also leads to a breakdown of the vibration damper. The cause of the jamming is the required short length of the piston compared to its diameter.

Moreover, it has now been realized as disadvantageous that the guiding elements of the separating piston are at the same time the sealing elements. Thus they are exposed to wear and to a change which has different effects on the periphery of the separating piston and which thus increases the danger of jamming.

It is accordingly an object of the invention to provide a separating piston especially suited for hydropneumatic one-pipe torsional vibration dampers which is free of the above-noted disadvantages.

This object is realized in accordance with the invention pursuant to which there is provided a separating piston for hydropneumatic vibration dampers consisting of a piston freely displaceable in a cylinder and carrying an annular elastomeric sealing element which separates the cylinder space into a chamber containing a hydraulic fluid and a chamber containing a pneumatic fluid. The elastomeric sealing element comprises an inner portion clamped by said piston, an outer portion contacting said cylinder and an intermediate web portion, whereby small displacements of the piston can be accommodated by flexing of said web portion without displacement of said outer sealing element portion relative to said cylinder.

The invention will be further described with reference to the accompanying drawings, wherein.

Figure 1:
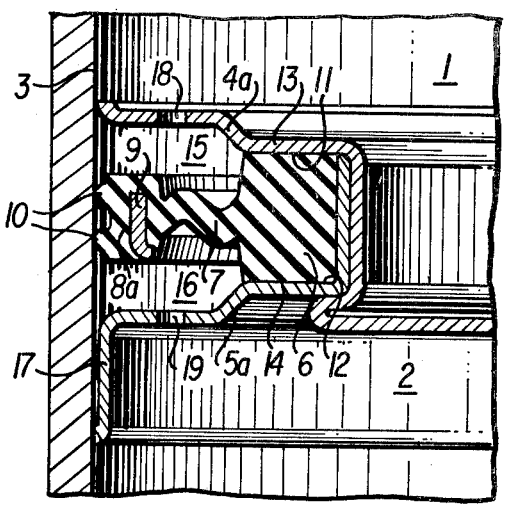
FIG. 1 is an axial longitudinal section through a cylinder wall and the peripheral portion of one embodiment of a piston and elastomeric sealing element in accordance with the present invention.

Referring now more particularly to the drawings, in FIG. 1 there are shown the cylinder and piston components of a hydropneumatic one-tube vibration damper. A hydraulic chamber 1 is filled with damping fluid and a compensation chamber 2 is filled with compressed gas, e.g. air, the chambers 1 and 2 being separated from each other within cylinder 3 by a piston. The piston comprises a deep-drawn case composed of guiding elements 4a and 5a into which the inner portion 6 of an annular elastomeric sealing element is clamped between sealing surfaces 11 and 14. Portion 6 is integral with a membrane-like or sinuous intermediate web portion 7 and an outer sealing portion 8a which contacts the cylinder wall. A metal or plastic ring 9 may be embedded in outer portion 8a to reinforce it and/or increase its contact pressure against the cylinder.

Because of the web-like or sinuous construction of intermediate portion 7, small displacements of the piston parts 4a and 5a can take place without displacement of outer portion 8a relative to the cylinder wall. Only in the event of large piston displacements, as a result of which the intermediate portion 7 is fully distended, will the outer portion 8a be displaced, with attendant friction.

Canting of the separating piston in the working cylinder is prevented by means of the guiding parts 4 and 5. The danger of canting can be further decreased by the annular skirt configuration 17 or by an appropriate choice of the outer diameters of the guiding parts 4a and 5a in the working cylinder 3.

In order to facilitate the streaming in and out of the fluid media into the chambers 15 and 16 in case of displacement of the separating piston without friction, suitable bores 18 and 19 can be provided in the guiding parts 4a and 5a.

In addition, to produce a reliable seal between sealing ring 8a and the working cylinder 3 as well as a sufficient contact pressure, the periphery of outer portion 8a is suitably shaped as at sealing surface 10.

The configurations of FIG. 1 contribute to preventing hardening of the intermediate portion 7 and permit its continued flexing, as needed.

Figure 2:
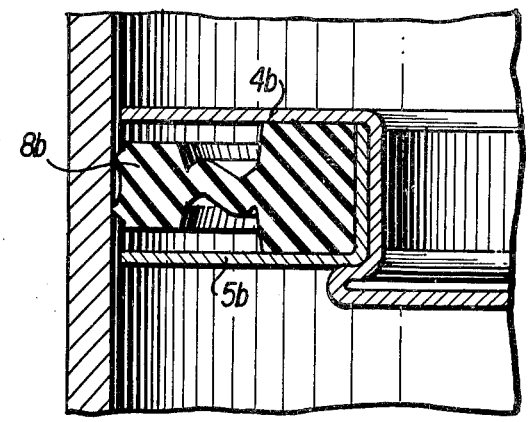
FIG. 2 is a similar view showing another piston embodiment in accordance with the present invention.

In FIG. 2 the piston is shorter but suitably shaped guiding portions 4b and 5b ensure its freedom from canting. Portion 8b carries no reinforcement.

Figure 3:
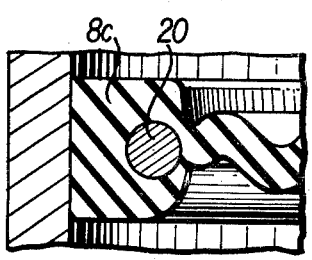
FIGS. 3, 4, 5 and 6 are similar views, without the pistons, showing other embodiments of elastomeric sealing elements.

FIGS. 3 to 6 show various configurations of the outermost portion of the elastomeric sealing elements. Thus, portion 8c in FIG. 3 is approximately rectangular at its outer periphery to make maximum contact with the cylinder wall. A metal or plastic annular ring 20 is embedded in portion 8c as a reinforcement and stiffener.

Figure 4:
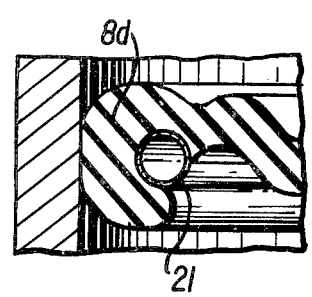

In FIG. 4 the portion 8d is approximately semicircular in outer configuration. At its inner section it is suitably shaped to receive a removable metal or plastic tubular reinforcement 21, which may be a garter-type or coiled spring.

Figure 5:
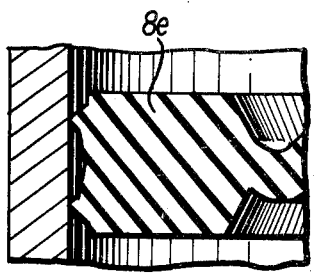

In FIG. 5 portion 8e resembles 8b of FIG. 2 but its width has been increased to increase the contact pressure against the cylinder wall.

Figure 6:
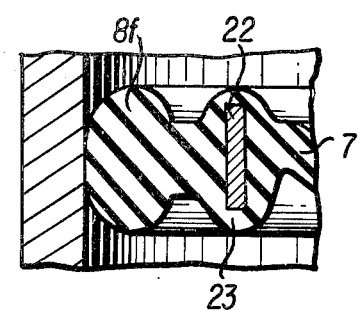

The configuration FIG. 6 incorporates the semicircular outermost configuration 8f with a metal reinforcement 22 included in an annular section 23 which is shaped as a collar between portions 7 and 8f.

It will be appreciated that the instant specification and examples are set forth by way of illustration and not limitation, and that various modifications and changes may be made without departing from the spirit and scope of the present invention.

I claim:

1. In a hydropneumatic one-tube vibration damper comprising a cylinder, a piston displaceably disposed within said cylinder, an annular elastomeric sealing element disposed about said piston and freely movable therewith and subdividing said cylinder into two separated fluid-tight chambers so that there will be no leakage between a hydraulic fluid in one of said chambers and pneumatic fluid in the other of said chambers, the improvement wherein said sealing element comprises an inner portion clamped by said piston, an outer portion in sliding contact with said cylinder and an intermediate flexible web portion connecting the inner and outer portions and flexing in response to small displacements of the piston to effect a small displacement of the piston without sliding displacement of said outer sealing element portion relative to said cylinder and wherein the outer portion of said sealing element is approximately semicircular in cross-section where it abuts the cylinder wall.

2. A vibration damper according to claim 1, wherein the outer periphery of said piston is provided with a receiver of metal or plastic into which the inner portion of the sealing element is rolled or clamped.

3. A vibration damper according to claim 1, wherein the piston is provided with an annular skirt thereby to prevent canting of said piston within said cylinder.

4. A vibration damper according to claim 1, including a metal or plastic ring embedded in the outer portion of the elastomeric sealing element which abuts the cylinder wall thereby reinforcing said sealing element.

5. A vibration damper according to claim 1, including a garter type spring vulcanized or laid onto the elastomeric seal thereby increasing the contact pressure between the cylinder wall and the elastomeric seal.

6. In a hydropneumatic one-tube vibration damper comprising a cylinder, a piston displaceably disposed within said cylinder, an annular elastomeric sealing element disposed about said piston and freely movable therewith and subdividing said cylinder into two separated fluid-tight chambers so that there will be no leakage between a hydraulic fluid in one of said chambers and pneumatic fluid in the other of said chambers, the improvement wherein said sealing element comprises an inner portion clamped by said piston, an outer portion in sliding contact with said cylinder and an intermediate flexible web portion connecting the inner and outer portions and flexing in response to small displacements of the piston to effect a small displacement of the piston without sliding displacement of said outer sealing element relative to said cylinder and a garter type spring vulcanized or laid onto the elastomeric seal thereby increasing the contact pressure between the cylinder wall and the elastomeric seal.

7. A vibration damper according to claim 6, wherein the outer periphery of said piston is provided with a receiver of metal or plastic into which the inner portion of the sealing element is rolled or clamped.

8. A vibration damper according to claim 6, wherein the piston is provided with an annular skirt thereby to prevent canting of said piston within said cylinder.

9. A vibration damper according to claim 6, including a metal or plastic ring embedded in the outer portion of the elastomeric sealing element which abuts the cylinder wall thereby reinforcing said sealing element.

10. A vibration damper according to claim 6, wherein the outer portion of said sealing element is approximately semicircular in cross-section where it abuts the cylinder wall.

11. A vibration damper according to claim 6, wherein the outer portion of said sealing element is substantially rectangular in cross-section where it abuts the cylinder wall.

* * * * *